(12) United States Patent
Kitashou et al.

(10) Patent No.: US 10,154,237 B2
(45) Date of Patent: Dec. 11, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Tetsurou Kitashou, Tokyo (JP); Hirokazu Isobe, Tama (JP); Naoki Kojima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/251,924

(22) Filed: Aug. 30, 2016

(65) Prior Publication Data
US 2017/0064274 A1 Mar. 2, 2017

(30) Foreign Application Priority Data
Sep. 1, 2015 (JP) .................................. 2015-172272

(51) Int. Cl.
*H04N 9/31* (2006.01)
(52) U.S. Cl.
CPC ................................ *H04N 9/3185* (2013.01)
(58) Field of Classification Search
CPC .................................................. H04N 9/3185
USPC ....... 348/746, 719, 714, 671, 576, 581, 571, 348/567, 561, 523, 403.1, 395.1, 349, 348/297, 262, 254, 247, 231.2, 231.99, 348/222.1, 217.1, 147, 141, 63, 49, 25; 382/300, 298, 299, 276, 264, 261, 248, 382/174, 166, 107; 345/127, 131, 132, 345/150, 157, 166, 173, 178, 179, 204
See application file for complete search history.

(56) References Cited

U.S. PATENT DOCUMENTS

| | | | | |
|---|---|---|---|---|
| 5,946,307 A | * | 8/1999 | Ohkuwa | H04N 7/24 348/441 |
| 6,339,434 B1 | * | 1/2002 | West | G06T 3/4023 345/667 |
| 6,903,733 B1 | * | 6/2005 | Greenberg | G06T 3/4084 345/204 |

(Continued)

FOREIGN PATENT DOCUMENTS

JP 2010-26870 A 2/2010

*Primary Examiner* — Michael Lee
(74) *Attorney, Agent, or Firm* — Canon U.S.A., Inc. IP Division

(57) ABSTRACT

An image processing apparatus includes a transformation unit, an identification unit, a determination unit, and a processing unit. The transformation unit is configured to perform transformation processing on an input image based on a transformation parameter. The identification unit is configured to identify transformation information related to amounts of transformation respectively between a first plurality of coordinates on a transformed image generated based on the transformation processing and a second plurality of coordinates on the input image corresponding to the first plurality of coordinates. The determination unit is configured to determine a smoothing parameter related to an intensity of smoothing processing for each region of the transformed image based on the transformation information. The processing unit is configured to perform smoothing processing on an image based on the input image, based on the smoothing parameter for each region.

14 Claims, 8 Drawing Sheets

(56) References Cited

U.S. PATENT DOCUMENTS

| | | | | |
|---|---|---|---|---|
| 2002/0048410 A1* | 4/2002 | So | G06T 3/0006 | 382/248 |
| 2002/0063807 A1* | 5/2002 | Margulis | G06T 1/20 | 348/745 |
| 2003/0026495 A1* | 2/2003 | Gondek | G06T 5/20 | 382/261 |
| 2006/0066731 A1* | 3/2006 | Zhou | G06T 3/00 | 348/222.1 |
| 2007/0035707 A1* | 2/2007 | Margulis | G03B 21/26 | 353/122 |
| 2007/0154114 A1* | 7/2007 | Tzeng | G06T 3/4023 | 382/300 |
| 2008/0062164 A1* | 3/2008 | Bassi | H04N 9/3147 | 345/214 |
| 2009/0080771 A1* | 3/2009 | Kamon | H04N 9/045 | 382/166 |
| 2010/0245393 A1* | 9/2010 | Moriya | G09G 5/391 | 345/660 |
| 2013/0162607 A1* | 6/2013 | Ichieda | G03B 21/14 | 345/204 |
| 2013/0176216 A1* | 7/2013 | Ichieda | G06F 3/033 | 345/157 |
| 2013/0307773 A1* | 11/2013 | Yagishita | G06F 3/0304 | 345/158 |
| 2014/0198188 A1* | 7/2014 | Izawa | H04N 13/0022 | 348/49 |
| 2014/0247287 A1* | 9/2014 | Saigo | G06T 7/80 | 345/682 |
| 2014/0333972 A1* | 11/2014 | Kitashou | H04N 1/40062 | 358/3.27 |
| 2015/0043786 A1* | 2/2015 | Ohki | H04N 5/23254 | 382/107 |

\* cited by examiner

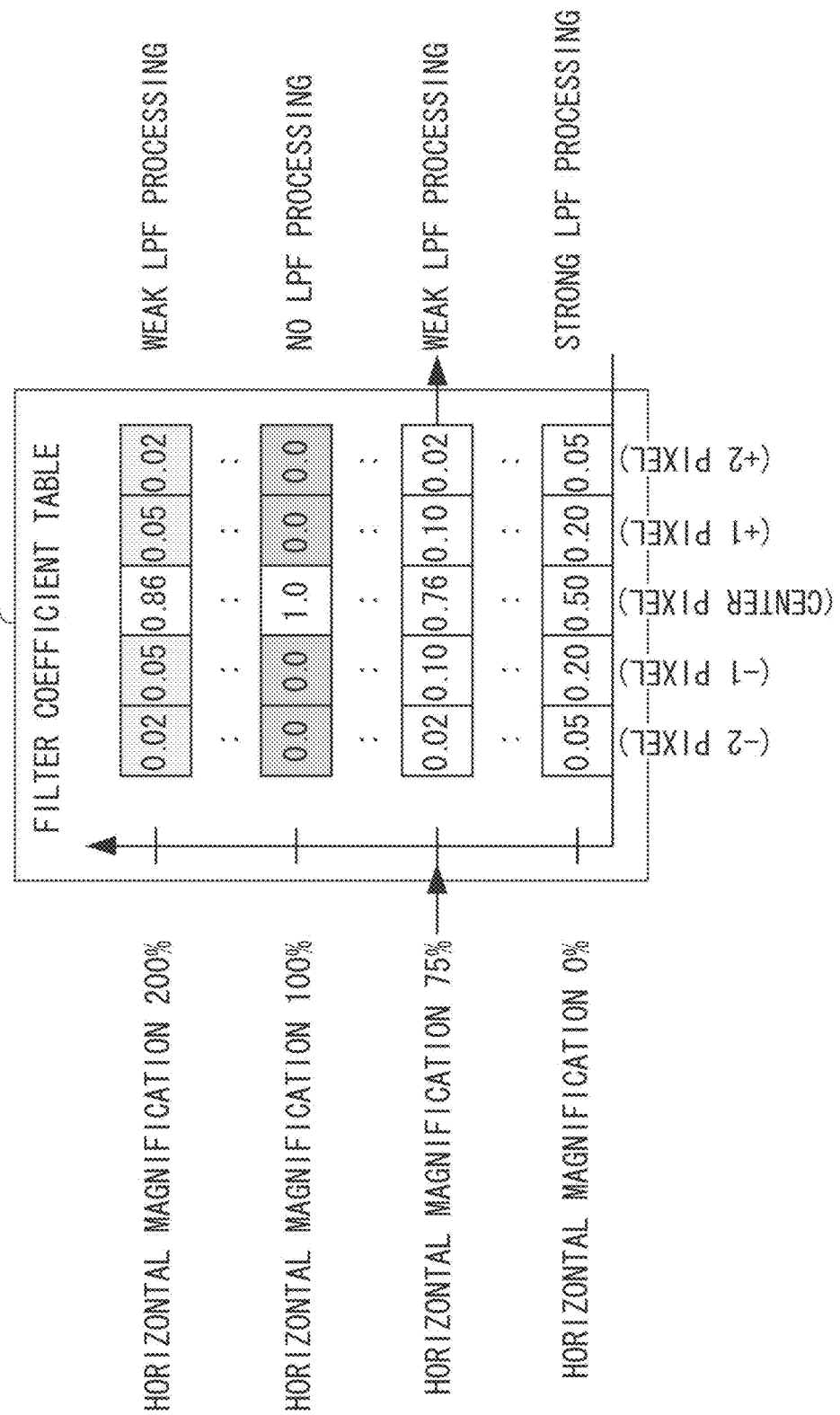

IMAGE PROCESSING APPARATUS, IMAGE PROCESSING METHOD, AND STORAGE MEDIUM

BACKGROUND OF THE INVENTION

Field of the Invention

One disclosed aspect of the embodiments relates to an image processing apparatus and an image processing method.

Description of the Related Art

Image transformation processing may be required in an image processing apparatus. For example, to prevent a trapezoidal distortion from occurring in a projected image, a projector apparatus performs image transformation processing called keystone (trapezoidal) correction processing in which image transformation is performed so that an image projected on a screen becomes rectangular-shaped. To perform image transformation processing such as keystone (trapezoidal) correction processing, the projector apparatus stores an input image in a frame memory and then generates, through interpolation, pixel values of coordinates of an output image from neighborhood pixels in the coordinates of the input image each corresponding to a different one of coordinates of the output image. The bicubic interpolation method is an example of an interpolation method.

When image transformation processing is performed on an image, an image quality degradation called moire (interference fringes) may arise. Moire refers to interference fringes caused by the difference between the pixel pitch of the output image and the pitch of the coordinates, on the input image, each corresponding to a different one of the pixels of the output image. Image quality degradation due to moire is caused by high-frequency components of an original image. Japanese Patent Application Laid-Open No. 2010-26870 discusses a technique for performing smoothing processing to eliminate high-frequency components to reduce moire. In the technique discussed in Japanese Patent Application Laid-Open No. 2010-26870, moire in an image into which an original image has been transformed based on a predetermined rule is reduced. More specifically, in the technique, the transformation ratio of the transformed image with respect to the original image for each pixel is derived to perform smoothing processing with the intensity varied according to the transformation ratio.

However, to reduce moire through the above-described method in various cases of image transformation processing, it is necessary to perform transformation ratio derivation processing corresponding to each case of the image transformation processing. If the transformation ratio derivation processing is performed for each case of required image transformation processing, this method enables applying suitable moire reduction processing only to predetermined image transformation processing. With this method, suitable moire reduction processing cannot be applied to image transformation processing different from the predetermined image transformation processing.

SUMMARY OF THE INVENTION

According to an aspect of the embodiments, an image processing apparatus includes a transformation unit, an identification unit, a determination unit, and a processing unit. The transformation unit is configured to perform transformation processing on an input image based on a transformation parameter. The identification unit is configured to identify transformation information related to amounts of transformation respectively between a first plurality of coordinates on a transformed image generated based on the transformation processing by the transformation unit and a second plurality of coordinates on the input image corresponding to the first plurality of coordinates The determination unit is configured to determine a smoothing parameter related to an intensity of smoothing processing for each region of the transformed image based on the transformation information identified by the identification unit. The processing unit is configured to perform smoothing processing on an image based on the input image, based on the smoothing parameter for each region determined by the determination unit.

Further features of the disclosure will become apparent from the following description of exemplary embodiments with reference to the attached drawings.

BRIEF DESCRIPTION OF THE DRAWINGS

FIG. 6 illustrates processing of a filter coefficient calculation unit according to the exemplary embodiment.

DESCRIPTION OF THE EMBODIMENTS

An exemplary embodiment of the disclosure will be described below with reference to the accompanying drawings.

Figure 1:
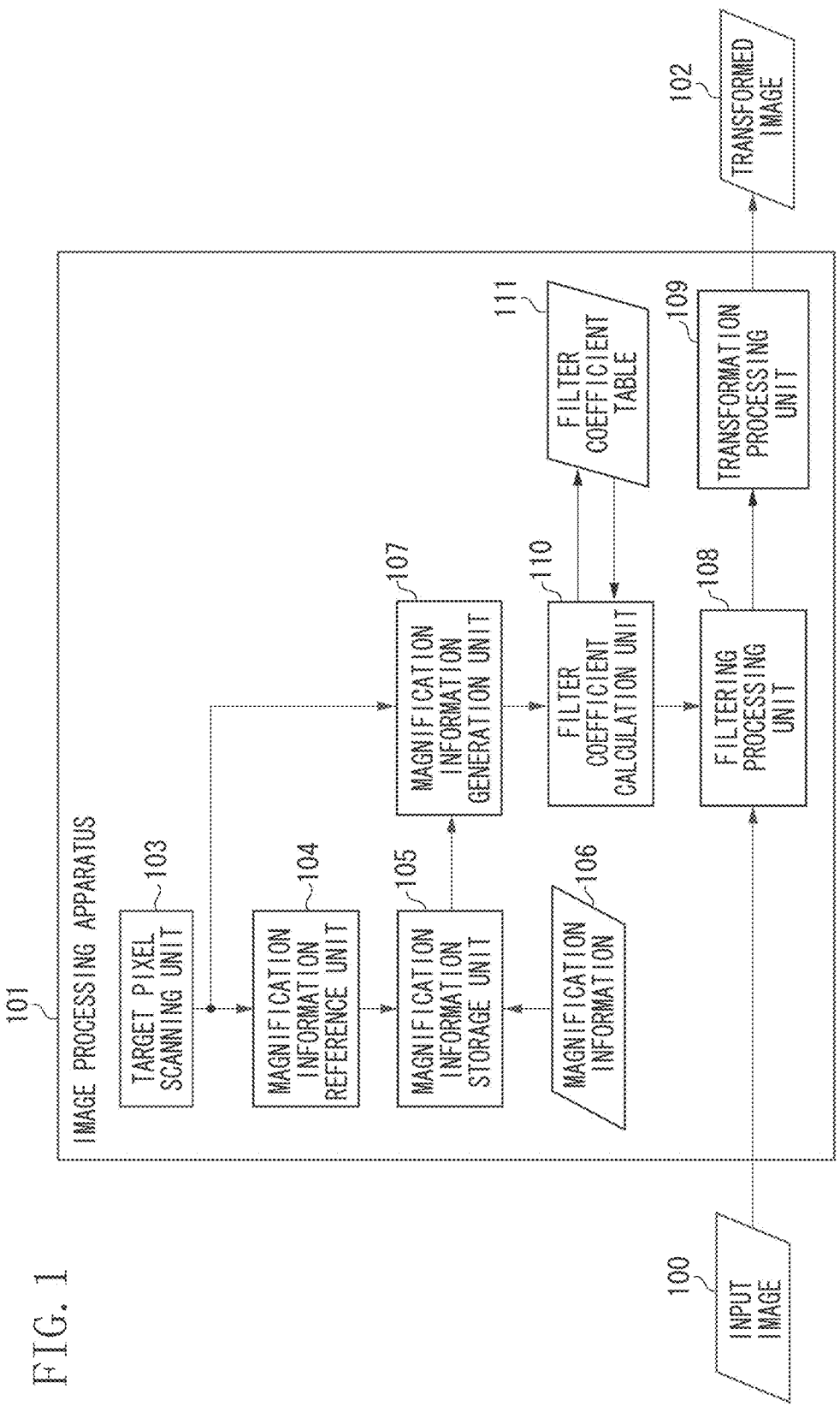
FIG. 1 illustrates an example of a configuration of an image processing apparatus according to an exemplary embodiment.

FIG. 1 is a block diagram illustrating an example of a configuration of an image processing apparatus according to the present exemplary embodiment. An image processing apparatus 101 according to the present exemplary embodiment receives an input image 100 as an input and outputs a transformed image 102 which is obtained by performing image transformation processing on the input image 100. The image transformation processing includes, for example, scaling processing such as enlargement and reduction, affine transformation processing such as rotation, keystone (trapezoidal) correction processing in projector projection, lens distortion correction processing, barrel distortion correction processing, pincushion distortion correction processing, distortion correction processing for cylindrical and prismatic projections, etc.

In the image transformation processing, the image processing apparatus 101 scans the coordinates of each pixel of the coordinate system of the transformed image 102, acquires neighborhood pixels of the corresponding coordinates in the input image 100, and performs the interpolation calculation by using the pixel values of the obtained neighborhood pixels to generate each pixel of the transformed image 102. In the following descriptions, for the convenience of descriptions, the coordinate system of the input image 100 before the image transformation processing is performed thereon is referred to as "the pre-transformation coordinate system", and the coordinate system of the transformed image 102 after the image transformation processing has been performed thereon is referred to as "the transformed coordinate system."

The image processing apparatus 101 includes a target pixel scanning unit 103, a magnification information reference unit 104, a magnification information storage unit 105, a magnification information storage unit 106, and a magnification information generation unit 107. The image processing apparatus 101 further includes a filtering processing unit 108, a transformation processing unit 109, a filter coefficient calculation unit 110, and a filter coefficient table 111.

Figure 2A:
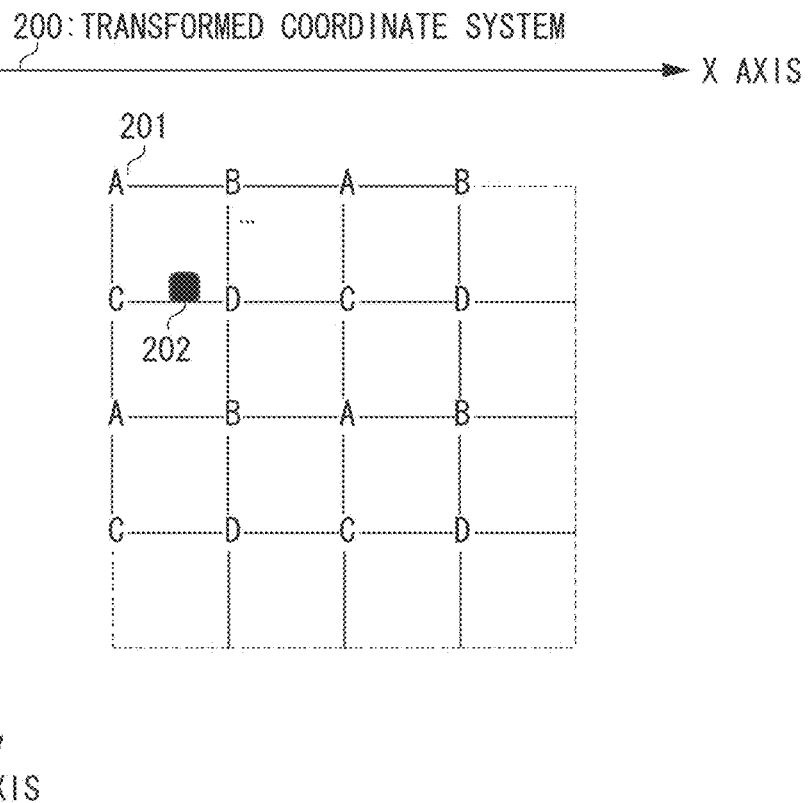
FIGS. 2A and 2B each illustrate processing of a target pixel scanning unit according to the exemplary embodiment.

The target pixel scanning unit 103 generates the coordinates of a target pixel to be generated in the transformed coordinate system. Processing of the target pixel scanning unit 103 will be described below with reference to FIGS. 2A and 2B. FIG. 2A illustrates an example of a relation between a grid point 201 and a target pixel 202 in a transformed coordinate system 200. The grid point 201 is, for example, a point on a division boundary formed when an image on which the image transformation is to be performed (the input image 100) is divided into a plurality of regions. Each pixel of an image on which the image transformation has been performed (the transformed image 102) is included by a plurality of the grid points 201. For example, as a method for dividing an image to be subjected to the image transformation, there is a method for dividing the image into a grid.

The magnification information about the grid points 201 in the pre-transformation coordinate system corresponding to the respective coordinates of the transformed coordinate system 200 is stored in the magnification information storage unit 106. The magnification information about the grid points 201 indicates the magnification of points, on the transformed image 102, each corresponding to a different one of the grid points 201. For example, in a case of the transformed image 102 formed by entirely reducing the input image 100 to 50%, a value of 50% is stored as the magnification information about the respective grid points 201.

For example, when processing according to the present exemplary embodiment is implemented by hardware, it may be necessary to increase the calculation speed by simultaneously referring to information about four grid points 201 which include the target pixel 202. Dividing the magnification information about the grid point 201 into a plurality of simultaneously accessible storage areas (or memories) and storing the information enable the reference of the magnification information about the grid points 201 required at the time of calculation in a parallel manner.

When the target pixel 202 is at any point at this timing, it is necessary to divide the magnification information about the grid points 201 so as to include the target pixel 202. To concurrently refer to the magnification information about the grid points 201 which include the target pixel 202, the magnification information about the adjacent grid points 201 needs to be divided. As an example of image division which satisfies such a condition, there is a method for dividing an image into grid points 201 of groups A, B, C, and D, as illustrated in FIG. 2A.

Dividing an image as an example illustrated in FIG. 2A enables parallelly referring to the magnification information about the four grid points 201 which include the target pixel 202 even when a certain target pixel 202 is selected in the transformed coordinate system 200. The target pixel scanning unit 103 scans the inside of the region included by the four grid points 201.

Although there are some division methods for dividing an image into grid points 201, rectangularly arranged grid points 201 enables the simplification of the calculation of the magnification information about the target pixel 202. More specifically, it becomes possible to calculate the magnification information by using a method to be described below with reference to FIG. 5A. Further, squarely arranged grid points 201 enables the implementation of the interpolation calculation required in the example illustrated in FIG. 5A with the same calculation in the horizontal and vertical directions (X-axis and Y-axis directions, respectively).

Figure 2B:
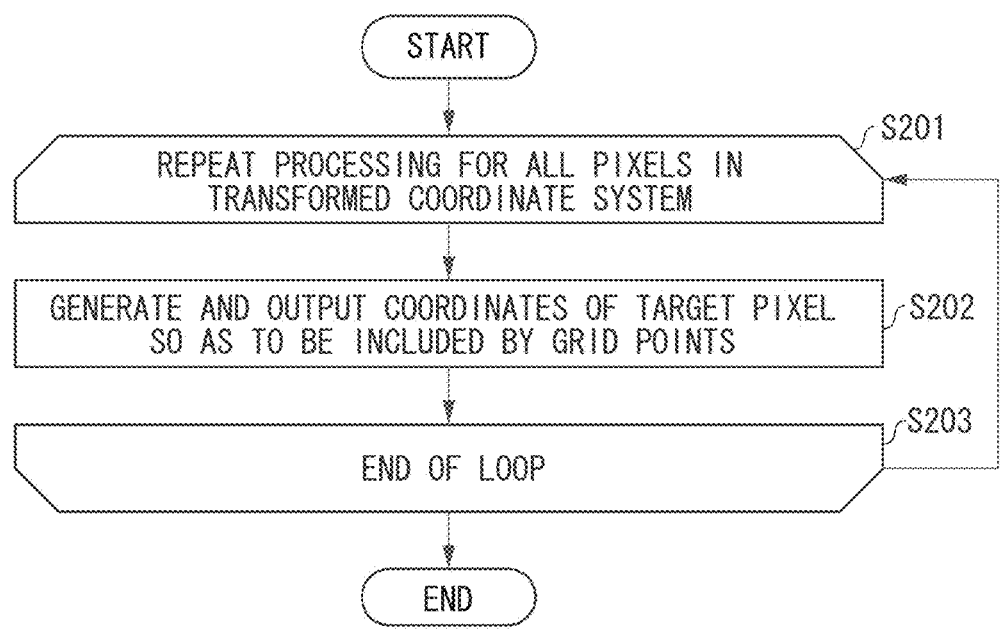

As illustrated in steps S201 to S203 illustrated in FIG. 2B, the target pixel scanning unit 103 repeatedly performs processing (step S202) for generating and outputting the coordinates of the target pixel 202 so as to be included by grid points 201 on all pixels in the transformed coordinate system.

The magnification information reference unit 104 receives as an input the coordinates of the target pixel 202 output from the target pixel scanning unit 103, and generates and outputs read addresses for reading from the magnification information storage unit 106 the magnification information about the grid points 201 which include the target pixel 202. Processing of the magnification information reference unit 104 will be described below with reference to FIGS. 3A and 3B.

Figure 3A:
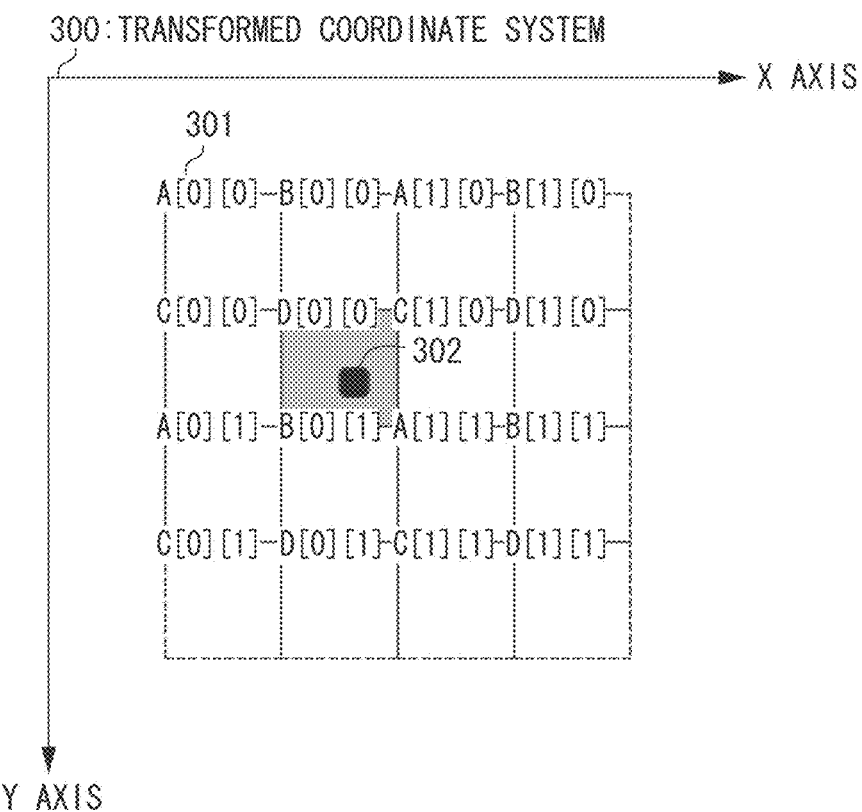
FIGS. 3A and 3B each illustrate processing of a magnification information reference unit according to the exemplary embodiment.
Figure 3B:
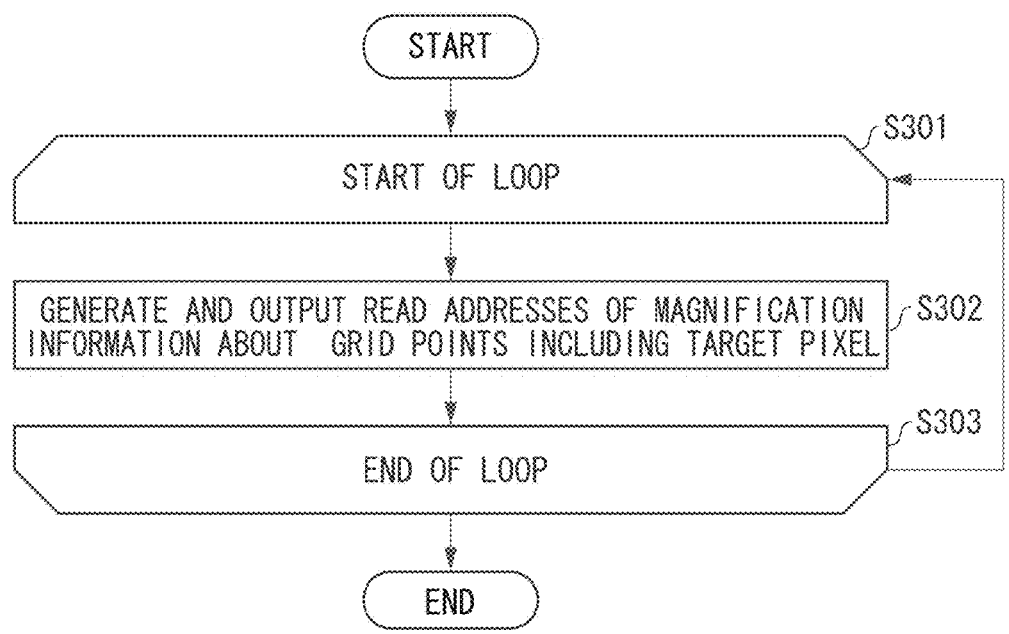

FIG. 3A illustrates the relation between grid points 301 and a target pixel 302 in the transformed coordinate system 300. Referring to FIG. 3A, the X-axis direction and Y-axis direction identifiers are supplied in parentheses to identify each of the grid points 301. The grid points 301 of groups A to D have formats A[x][y] to D[x][y], respectively. For example, A[1][0] indicates the 1-th grid point in the X-axis direction and the 0-th grid point in the Y-axis direction out of the grid points 301 of group A.

In the example illustrated in FIG. 3A, when the position of the target pixel 302 is selected, the grid points 301 which include the target pixel 302 are selected. More specifically, D[0][0] is selected as the upper left grid point 301, C[1][0] is selected as the upper right grid point 301, B[0][1] is selected as the lower left grid point 301, and A[1][1] is selected as the lower right grid point 301.

The magnification information reference unit 104 outputs, for example, the identifiers of the selected grid points 301 as read addresses of the magnification information about the grid points 301 which include the target pixel 302. As illustrated in steps S301 to S303 in FIG. 3B, for respective input coordinates of the target pixel 302, the magnification information reference unit 104 repeatedly performs processing (step S302) for generating and outputting the read addresses of the magnification information about the grid points 301 which include the target pixel 302.

Figure 4:
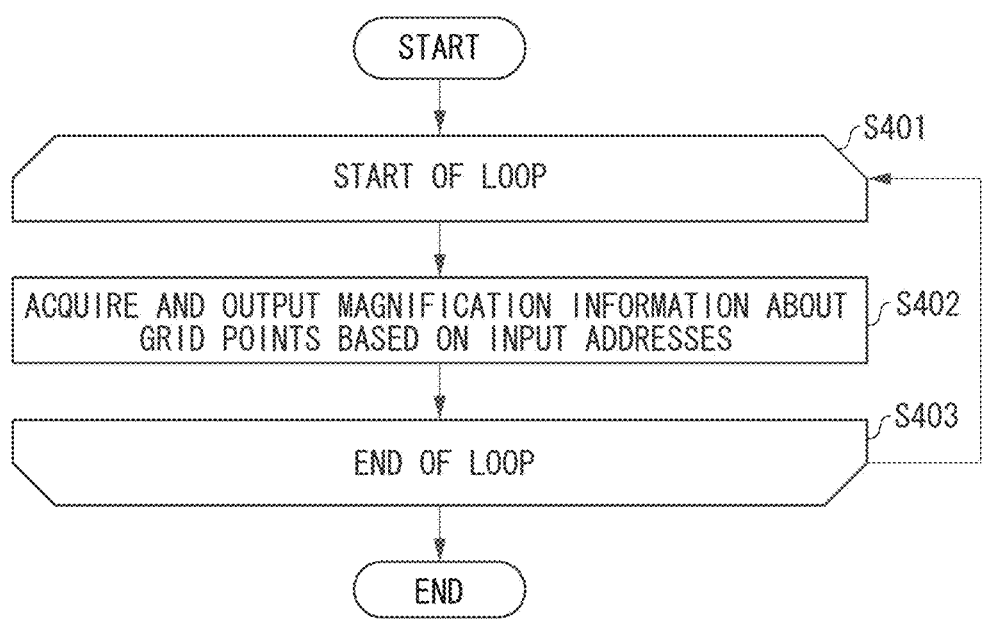
FIG. 4 illustrates processing of a magnification information storage unit according to the exemplary embodiment.

The magnification information storage unit 105 refers to the input read addresses of the magnification information about the grid points 301 which include the target pixel 302 from the magnification information reference unit 104, and acquires the magnification information about these grid points 301 from the magnification information storage unit 106. The magnification information storage unit 105 further outputs the acquired magnification information about the grid points 301 to the magnification information generation unit 107. For example, referring to the example illustrated in FIG. 3A, the magnification information storage unit 105 outputs the magnification information about the upper left grid point 301 D[0][0], the upper right grid point 301 C[1][0], the lower left grid point 301 B[0][1], and the lower right grid point 301 A[1][1] which include the target pixel 302. As illustrated in steps S401 to S403 illustrated in FIG. 4, for each target pixel 302, the magnification information storage unit 105 repeatedly performs processing (step S402) for acquiring and outputting the magnification information about the grid points 301 based on the input read addresses of the magnification information about the grid points 301 which include the target pixel 302.

Then, the magnification information generation unit 107 generates the magnification information corresponding to the coordinates of the target pixel 302 through interpolation calculation based on the input magnification information about the grid points 301, which include the target pixel 302, obtained from the magnification information storage unit 105 and the coordinates of the target pixel 302 obtained from the target pixel scanning unit 103. Referring to an example illustrated in FIG. 5A, the magnification information generation unit 107 calculates the magnification information for a target pixel 504 by performing interpolation calculation by using the magnification information about grid points 501 A to D which include the target pixel 504.

Figure 5A:
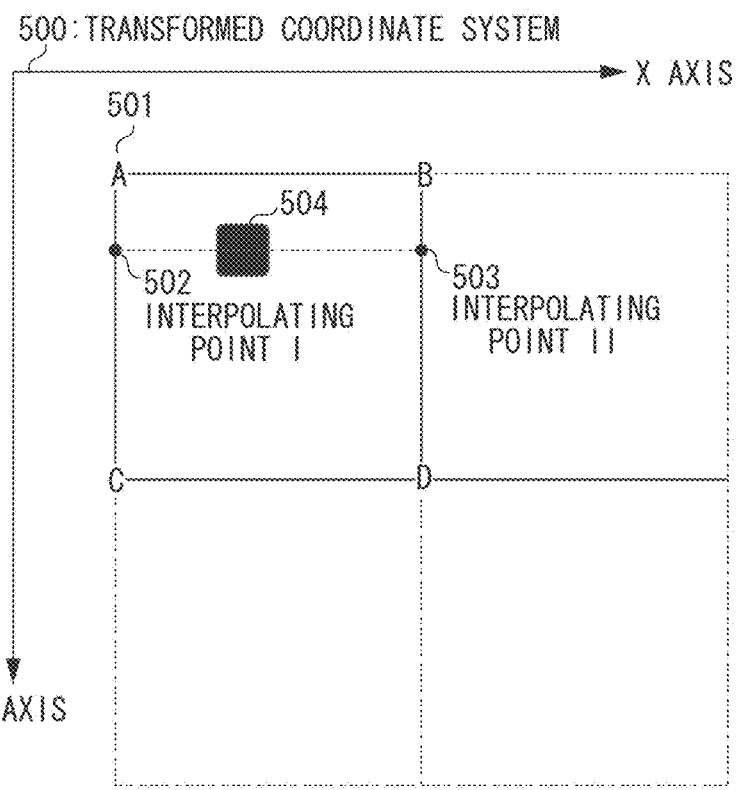
FIGS. 5A and 5B each illustrate processing of a magnification information generation unit according to the exemplary embodiment.

Referring to the example illustrated in FIG. 5A, the magnification information generation unit 107 performs interpolation calculation on the magnification information in the Y-axis direction. The magnification information generation unit 107 performs interpolation calculation to obtain the magnification information about an interpolating point I 502 by using the magnification information about the grid points 501 A and C, and performs interpolation calculation to obtain the magnification information about an interpolating point II 503 by using the magnification information about the grid points 501 B and D. Then, the magnification information generation unit 107 performs the interpolation calculation to obtain the magnification information about the target pixel 504 in the X-axis direction by using the magnification information about the interpolating points I 502 and II 503 obtained through the interpolation calculation and outputs the obtained magnification information. Although, in the above-described example, the magnification information generation unit 107 performs the interpolation calculation in the Y-axis direction by using the magnification information about the grid points 501 A to D and then performs the interpolation calculation in the X-axis direction, the magnification information generation unit 107 may perform the interpolation calculation in the X-axis direction and then perform the interpolation calculation in the Y-axis direction.

Figure 5B:
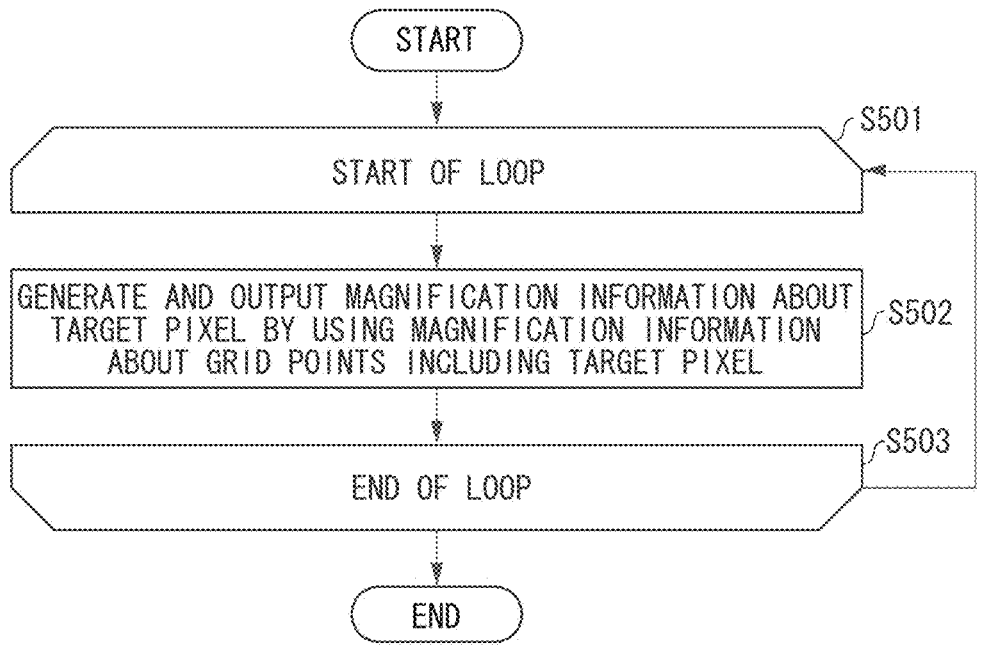

As illustrated in steps S501 to S503 illustrated in FIG. 5B, for each target pixel 504, the magnification information generation unit 107 repeatedly performs processing (step S502) for generating and outputting the input magnification information about the target pixel 504 by using the input magnification information about the grid points 501 which include the target pixel 504. Thus, the magnification information is generated and output for all pixels in the transformed image 102.

The filter coefficient calculation unit 110 inputs the magnification information about each pixel in the transformed image 102 output from the magnification information generation unit 107 and calculates the filter coefficient. The filter coefficient calculation unit 110 calculates the filter coefficient by referring to the filter coefficient table 111 which holds the filter coefficient corresponding to each piece of magnification information. Then, the filter coefficient calculation unit 110 outputs the calculated filter coefficient to the filtering processing unit 108.

The filtering processing unit 108 inputs the input image 100 and the filter coefficient output from the filter coefficient calculation unit 110, performs filtering processing on the input image 100, and outputs a filtering-processed image having undergone filtering processing. In the present exemplary embodiment, the filtering processing unit 108 performs on the input image 102 low-pass filtering processing (hereinafter referred to as "LPF processing") for eliminating high-frequency components.

The transformation processing unit 109 inputs the filtering-processed image output from the filtering processing unit 108, performs the image transformation processing on the filtering-processed image, and outputs the transformed image 102 having undergone the image transformation processing. The transformation processing unit 109 performs, for example, scaling processing such as enlargement and reduction, affine transformation processing such as rotation, and correction processing in projector projection, such as keystone (trapezoidal) correction processing, lens distortion correction processing, barrel distortion correction processing, pincushion distortion correction processing, and distortion correction processing for cylindrical and prismatic projections.

The filtering processing performed on the input image 100 according to the present exemplary embodiment will be described below. The filter coefficient table 111 stores the filter coefficient corresponding to each piece of magnification information and outputs the filter coefficient corresponding to the magnification information.

As an example of the magnification information, the horizontal magnification which is the magnification in the horizontal direction will be described below. In a transformed image, the 100% horizontal magnification means that the magnification at the coordinates in the horizontal direction is 100% (not magnified). With respect to the 100% horizontal magnification, the 0% horizontal magnification side means a smaller magnification in the horizontal direction and the 200% horizontal magnification side means a larger magnification in the horizontal direction. The upper and lower limits of the horizontal magnification may be determined according to the image transformation type of the image transformation processing to be presumably used in the image processing apparatus 101. For example, when a transformed image with a horizontal magnification exceeding 200% is formed, the filter coefficient to be stored in the filter coefficient table 111 may be changed on the basis of the upper limit of the horizontal magnification.

Referring to an example illustrated in FIG. 6, in the filter coefficient table 111, each of filter coefficients is associated with one of a piece of horizontal magnification information. In the present exemplary embodiment, the filter coefficient table 111 stores filter coefficients for LPF processing. The filter coefficients for LPF processing are weighting coefficients for reference pixels centering on a target pixel 504 in a certain region. In the example illustrated in FIG. 6, the filter coefficient table 111 stores weighting coefficients for a total of five pixels including the center pixel as a target pixel 504 and 4 neighborhood pixels in the ±2-pixel range.

The sum of the weighting coefficients for these 5 pixels generally is equivalent to 1.0. The weighting coefficients are symmetrical with respect to the center pixel. When the filter coefficient for the center pixel is close to 1.0, the value of the center pixel becomes dominant and therefore the effect of LPF processing decreases. In this case, an image close to the input image is output as an LPF processed image. On the other hand, when the filter coefficient for the center pixel is low, the values of the peripheral pixels become dominant and therefore the effect of LPF processing increases. In this case, the input image is subjected to strong smoothing processing and is output.

In the filter coefficient table 111 according to the present exemplary embodiment, filter coefficients involving low effect of LPF processing are associated with large horizontal magnifications, and filter coefficients involving high effect of LPF processing are associated with small horizontal magnifications. This applies not only to the horizontal magnifications but also to the vertical magnifications.

Figure 7:
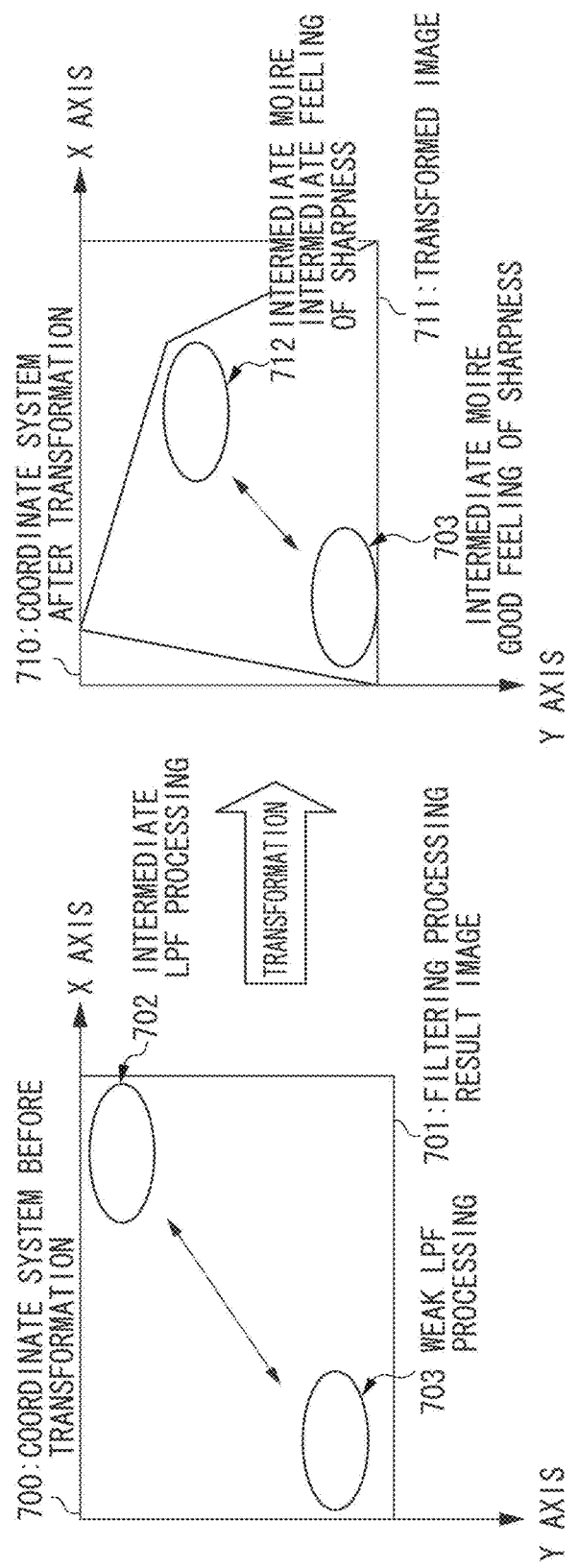
FIG. 7 illustrates an effect of filtering processing according to the exemplary embodiment.

Associating the filter coefficients with the magnification information in this way provides the following effects. Referring to FIG. 7, when image transformation processing is performed on a filtering processing result image 701 in the pre-transformation coordinate system 700, a transformed image 711 in the transformed coordinate system 710 results. In this example, when the filtering processing result image 701 is compared with the transformed image 711, the magnification of an upper right portion 702 of the filtering processing result image 701 is smaller than that of a lower left portion 703 thereof.

Therefore, in the present exemplary embodiment, stronger LPF processing is applied to the upper right portion 702 of the filtering processing result image 701 than to the lower left portion 703 thereof. Although the LPF processing is effective for reducing moire caused by image transformation processing, it reduces a feeling of sharpness of the image. As a result, the reduction of moire and the maintenance of the feeling of sharpness cannot be achieved at the same time simply by applying strong LPF processing.

On the other hand, as illustrated in the filtering processing result image 711, the present exemplary embodiment makes it possible to maintain a feeling of sharpness while reducing moire in various types of image transformation processing by changing the intensity of LPF processing according to the magnification in the image transformation processing. Referring to the example of the transformed image 711 illustrated in FIG. 7, it is possible to moderately maintain the feeling of sharpness while moderately reducing moire at an upper right portion 712, and maintain a good feeling of sharpness while moderately reducing moire at a lower left portion 713.

According to the present exemplary embodiment, image transformation processing is performed after the magnification information about each pixel of a transformed image has been generated, and filtering processing with the filter coefficient according to the magnification information is performed. With this configuration, suitable moire reduction processing can be performed according to the image transformation processing to be performed on the input image, and moire reduction processing suitable for various types of image transformation processing can be performed.

Although, in the present exemplary embodiment, an image on which the image transformation is to be performed is divided into a plurality of regions and processed based on the magnification information after transformation corresponding to each region, the processing is not limited thereto. A transformed image may be divided into a plurality of regions and processed based on the magnification information before transformation has been performed corresponding to each region. In this case, however, to acquire similar effects, it is necessary to provide an opposite relation between the magnification information and the intensity of filter coefficients to be stored in the filter coefficient table 111 to the relation in the example illustrated in FIG. 6. More specifically, in the filter coefficient table 111, it is necessary to associate the filter coefficients with the magnification so that the intensity of LPF processing decreases for small magnifications before transformation and the intensity of LPF processing increases for large magnifications before transformation. Setting the filter coefficient table 111 in this way achieves the implementation of moire reduction processing suitable for various types of image transformation processing also on a configuration in which a transformed image is scanned and then image transformation processing is performed thereon.

Although, in the present exemplary embodiment, the filtering processing unit 108 performs LPF processing as an example of filtering processing, it may perform other filtering processing such as sharpness processing. In this case, the filtering processing unit 108 is able to perform moire reduction processing suitable for various types of image transformation processing not only through LPF processing but also through other filtering processing for adjusting frequency components of an image.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

Figure 8:
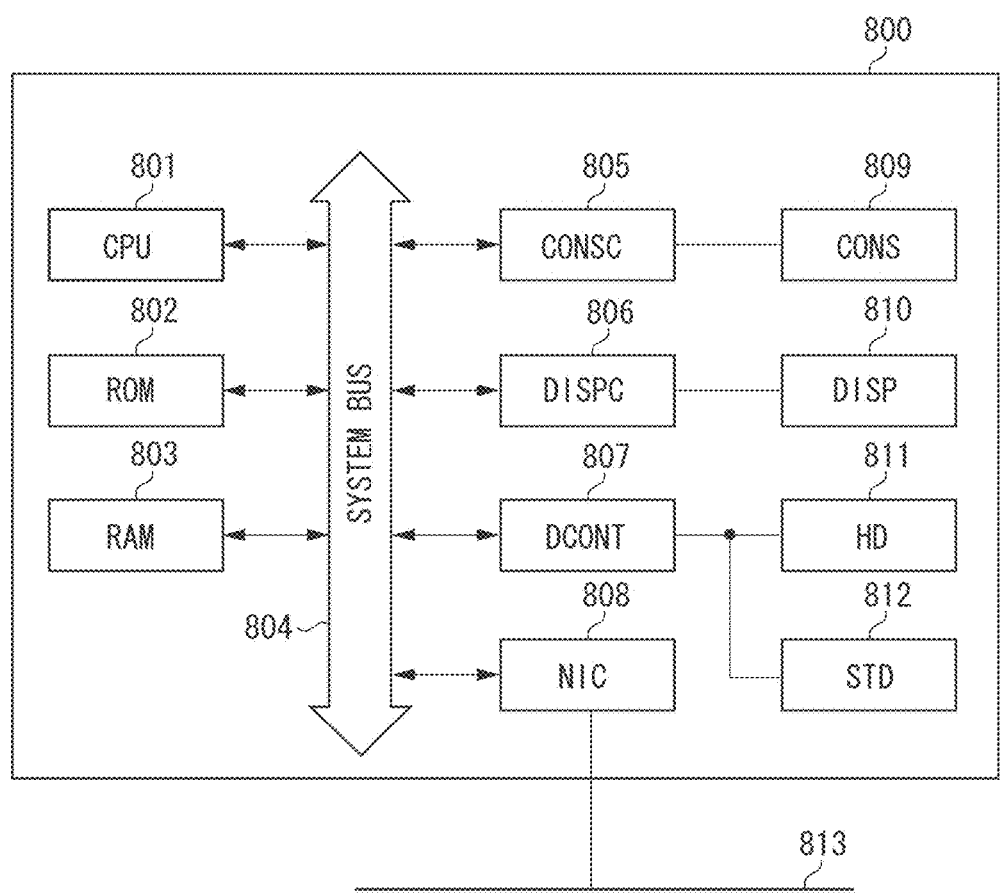
FIG. 8 illustrates computer functions capable of implementing the image processing apparatus according to the exemplary embodiment.

For example, the image processing apparatus 101 according to the above-described exemplary embodiment includes a computer function 800 as illustrated in FIG. 8. The operations according to the above-described exemplary embodiment are implemented by the CPU 801. The computer function 800 includes a CPU 801, a ROM 802, and a RAM 803, as illustrated in FIG. 8. The computer function 800 further includes a controller (CONSC) 805 for an operation unit (CONS) 809, and a display controller (DISPC) 806 for a display (DISP) 810 as a display unit. The computer function 800 further includes a controller (DCONT) 807 for a hard disk (HD) 811 and a storage device (STD) 812 such as a flexible disk, and a network interface card (NIC) 808. These function units 801, 802, 803, 805, 806, 807, and 808 are configured to be mutually connected via a system bus 804 so that they can communicate with each other.

The CPU 801 executes software stored in the ROM 802, the HD 811, or software supplied from the STD 812 to control the all components connected to the system bus 804. More specifically, the CPU 801 reads processing programs for performing the above-described operations from the ROM 802, the HD 811, or the STD 812 and executes it to perform control for implementing the operations described in the above-described exemplary embodiment. The RAM 803 functions as a main memory or a work area for the CPU 801. The CONSC 805 controls input of an instruction from the CONS 809. The DISPC 806 controls display of the DISP 810. The DCONT 807 controls access to the HD 811 and the STD 812 for storing a boot program, various applications, user files, network management programs, and processing programs for performing above-described operations. The NIC 808 bidirectionally exchanges data with other apparatuses on the network 813.

The present exemplary embodiment is to be considered as illustrative in embodying the disclosure, and not restrictive of the technical scope of the disclosure. The disclosure may be embodied in diverse forms without departing from the technical concepts or essential characteristics thereof.

In the configuration according to the present exemplary embodiment, it is possible to perform moire reduction processing suitable for various types of image transformation processing.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-172272, filed Sep. 1, 2015, which is hereby incorporated by reference herein in its entirety.

What is claimed is:

1. An image processing apparatus comprising:
   a processor; and
   a memory coupled to the processor and containing instructions that, when executed by the processor, cause the processor to perform operations comprising:
   performing transformation processing, the transformation processing including keystone correction or curved surface transformation;
   identifying transformation information related to amounts of transformation respectively between a first plurality of coordinates on a transformed image obtained by performing the transformation processing on an input image and a second plurality of coordinates on the input image corresponding to the first plurality of coordinates;
   determining, based on the identified transformation information, a smoothing parameter related to an intensity of smoothing processing for reducing high-frequency components of an image for each region of the transformed image;
   performing the smoothing processing on an image based on the input image, based on the determined smoothing parameter for each region; and
   outputting an output image obtained by performing the transformation processing on the image based on the input image after having been smoothened through the smoothing processing.

2. The image processing apparatus according to claim 1, wherein, as the transformation information, the identification unit identifies information indicating a transformation magnification between the coordinates on the input image and the corresponding coordinates on the transformed image.

3. The image processing apparatus according to claim 1, wherein the operations further comprises:
   storing specific transformation information related to amounts of transformation respectively between first specific coordinates at predetermined intervals on the input image and second specific coordinates on the transformed image corresponding to the first specific coordinates,
   wherein the operation of identifying identifies the transformation information between the first and the second plurality of coordinates by performing interpolation processing on the stored specific transformation information.

4. The image processing apparatus according to claim 1, wherein the operations further comprises:
   storing specific transformation information related to amounts of transformation respectively between first divided regions of either one of the input image and the transformed image and second divided regions of the other one of the input image and the transformed image corresponding to the first divided regions,
   wherein the operation of identifying identifies the transformation information between the first and the second plurality of coordinates by referring to the stored specific transformation information.

5. The image processing apparatus according to claim 1, wherein, as the smoothing processing performs, on the transformed image, filtering processing using a low-pass filter generated based on the smoothing parameter.

6. The image processing apparatus according to claim 1, wherein, as the smoothing processing performs filtering processing on the input image based on the smoothing parameter.

7. The image processing apparatus according to claim 1, wherein the operations further comprises:
   storing transformation information corresponding to vertex coordinates of each divided region of the input image,
   wherein the storing stores the transformation information so that the transformation information corresponding to adjacent vertex coordinates are read in parallel, and
   wherein the identifying identifies transformation information about coordinates on the transformed image by reading in parallel each piece of transformation information about four vertex coordinates, on the input image, each corresponding to a different one of the coordinates on the transformed image and then performing interpolation processing on each piece of the transformation information about the four vertex coordinates.

8. The image processing apparatus according to claim 1, wherein the operations further comprises:
   storing a filter coefficient table in which the transformation information is associated with the smoothing parameter,
   wherein the identifying identifies the smoothing parameter by referring to the filter coefficient table.

9. An image processing method comprising:
   identifying transformation information related to amounts of transformation respectively between a first plurality of coordinates on a transformed image obtained by performing transformation processing on an input image including keystone correction or curved surface transformation and a second plurality of coordinates on the input image corresponding to the first plurality of coordinates;

determining, based on the identified transformation information, a smoothing parameter related to an intensity of smoothing processing for reducing high-frequency components of an image for each region of the transformed image;

performing the smoothing processing on an image based on the input image, on the basis of the determined smoothing parameter for each determined region; and outputting an output image obtained by performing the transformation processing on the image based on the input image after having been smoothened through the smoothing processing.

10. The image processing method according to claim 9, further comprising:

performing memory control for controlling a storage unit to store specific transformation information related to amounts of transformation respectively between first specific coordinates at predetermined intervals on the input image and second specific coordinates on the transformed image corresponding to the first specific coordinates, wherein, in the identifying, the transformation information between the first and the second plurality of coordinates is identified by performing interpolation processing on the specific transformation information stored by the storage unit.

11. The image processing method according to claim 9, further comprising:

performing memory control for controlling a storage unit to store specific transformation information related to amounts of transformation respectively between first divided regions of either one of the input image and the transformed image and second divided regions of the other one of the input image and the transformed image corresponding to the first divided regions, wherein, in the identifying, the transformation information between the first and the second plurality of coordinates is identified by referring to the specific transformation information stored by the storage unit.

12. A non-transitory computer-readable storage medium storing a program for causing a computer to execute an image processing method, the method comprising:

identifying transformation information related to amounts of transformation relatively between a first plurality of coordinates on a transformed image obtained by performing transformation processing on an input image including keystone correction or curved surface transformation and a second plurality of coordinates on the input image corresponding to the first plurality of coordinates;

determining, based on the identified transformation information a smoothing parameter related to an intensity of smoothing processing for reducing high-frequency components of an image for each region of the transformed image;

performing the smoothing processing on an image based on the input image, on the basis of the determined smoothing parameter for each determined region; and outputting an output image obtained by performing the transformation processing on the image based on the input image after having been smoothened through the smoothing processing.

13. The non-transitory medium according to claim 12, wherein the method further comprises:

performing memory control for controlling a storage unit to store specific transformation information related to amounts of transformation respectively between first specific coordinates at predetermined intervals on the input image and second specific coordinates on the transformed image corresponding to the first specific coordinates, wherein, in the identifying, the transformation information between the first and the second plurality of coordinates is identified by performing interpolation processing on the specific transformation information stored by the storage unit.

14. The non-transitory medium according to claim 12, wherein the method further comprises:

performing memory control for controlling a storage unit to store specific transformation information related to amounts of transformation respectively between first divided regions of either one of the input image and the transformed image and second divided regions of the other one of the input image and the transformed image corresponding to the first divided regions, wherein, in the identifying, the transformation information between the first and the second plurality of coordinates is identified by referring to the specific transformation information stored by the storage unit.

* * * * *